United States Patent
Sundar et al.

(10) Patent No.: US 9,940,262 B2
(45) Date of Patent: Apr. 10, 2018

(54) IMMEDIATE BRANCH RECODE THAT HANDLES ALIASING

(71) Applicant: Apple Inc., Cupertino, CA (US)

(72) Inventors: Shyam Sundar, Sunnyvale, CA (US); Richard F. Russo, San Jose, CA (US); Ronald P. Hall, Cedar Park, TX (US); Conrado Blasco, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 260 days.

(21) Appl. No.: 14/491,149

(22) Filed: Sep. 19, 2014

(65) Prior Publication Data

US 2016/0085550 A1    Mar. 24, 2016

(51) Int. Cl.
| | |
|---|---|
| *G06F 12/1045* | (2016.01) |
| *G06F 12/0875* | (2016.01) |
| *G06F 9/38* | (2006.01) |
| *G06F 9/32* | (2006.01) |
| *G06F 12/1027* | (2016.01) |

(52) U.S. Cl.
CPC .......... *G06F 12/1045* (2013.01); *G06F 9/324* (2013.01); *G06F 9/382* (2013.01); *G06F 9/3804* (2013.01); *G06F 12/0875* (2013.01); *G06F 12/1027* (2013.01); *G06F 2212/452* (2013.01); *G06F 2212/684* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,822,576 A | * | 10/1998 | Dinkjian | G06F 9/3844 712/239 |
| 5,881,277 A | * | 3/1999 | Bondi | G06F 9/3804 712/219 |
| 6,279,106 B1 | * | 8/2001 | Roberts | G06F 9/322 712/239 |
| 6,609,194 B1 | | 8/2003 | Henry et al. | |

(Continued)

OTHER PUBLICATIONS

Calder et al., "Fast & Accurate Instruction Fetch and Branch Prediction", Proceedings of the 21st Annual International Symposium on Computer Architecture, Apr. 18, 1994, 10 pages, IEEE Computer Society Press, Los Alamitos, CA, USA.

*Primary Examiner* — Midys Rojas
*Assistant Examiner* — Marwan Ayash
(74) *Attorney, Agent, or Firm* — Rory D. Rankin; Myertons, Hood, Kivlin, Kowert & Goetzel, P.C.

(57) ABSTRACT

A system and method for efficiently indicating branch target addresses. A semiconductor chip predecodes instructions of a computer program prior to installing the instructions in an instruction cache. In response to determining a particular instruction is a control flow instruction with a displacement relative to a program counter address (PC), the chip replaces a portion of the PC relative displacement in the particular instruction with a subset of a target address. The subset of the target address is an untranslated physical subset of the full target address. When the recoded particular instruction is fetched and decoded, the remaining portion of the PC relative displacement is added to a virtual portion of the PC used to fetch the particular instruction. The result is concatenated with the portion of the target address embedded in the fetched particular instruction to form a full target address.

18 Claims, 6 Drawing Sheets

(56) References Cited

U.S. PATENT DOCUMENTS

| | | | |
|---|---|---|---|
| 7,165,169 B2 | 1/2007 | Henry et al. | |
| 7,415,638 B2 | 8/2008 | Smith et al. | |
| 2002/0194463 A1* | 12/2002 | Henry | G06F 9/30149 |
| | | | 712/239 |
| 2003/0070062 A1* | 4/2003 | Krishnan | G06F 9/30058 |
| | | | 712/234 |
| 2004/0148468 A1* | 7/2004 | Hooker | G06F 9/30043 |
| | | | 711/132 |
| 2006/0026385 A1* | 2/2006 | Dinechin | G06F 12/1036 |
| | | | 711/210 |
| 2008/0082721 A1* | 4/2008 | Yu | G06F 12/0864 |
| | | | 711/3 |
| 2011/0055529 A1* | 3/2011 | McDonald | G06F 9/3806 |
| | | | 712/238 |
| 2015/0100769 A1* | 4/2015 | Jacobs | G06F 9/3806 |
| | | | 712/239 |

\* cited by examiner

IMMEDIATE BRANCH RECODE THAT HANDLES ALIASING

BACKGROUND

Technical Field

Embodiments disclosed herein are related to computing systems, and more particularly, to efficiently indicating branch target addresses.

Description of the Relevant Art

With each generation, semiconductor chips provide more functionality and performance. For example, the semiconductor chips include superscalar processing of instructions, overlapping pipeline stages, out-of-order and speculative execution of instructions, simultaneous multi-threading, and so forth. To support both superscalar and speculative execution, the semiconductor chip fetches multiple instructions simultaneously and predicts the next fetch address to begin fetching instructions.

Control flow instructions perform a determination of which path to take in an instruction stream. Control dependencies caused by conditional control flow instructions serialize instructions at conditional forks and joins along the control flow graph of the source code. Speculative execution of instructions is used to perform parallel execution of instructions despite control dependencies in the source code. The next fetch address to fetch instructions may differ from a next sequential address as occurs with a typical fetch. The sequential address may differ from the current fetch address by a given offset. The next fetch address that is a non-sequential address may differ from the current fetch address by a displacement larger than the given offset.

In various examples, the next fetch address may be specified as a relative displacement within the control flow instruction. An immediate field within the control flow instruction may store the relative displacement. After the control flow instruction is fetched and the opcode is decoded, the relative displacement may be added with the current fetch address or the next sequential address. The result of the addition is the target address. The semiconductor chip includes a next fetch predictor for selecting between at least the next sequential address and the target address. The selected address is used to fetch instructions to process following the control flow instruction.

To reduce the amount of processing performed for a control flow instruction with a relative displacement, predecoding and generation of the target address may occur prior to the control flow instruction being stored in the instruction cache. After fetching, the target address may be used earlier by next fetch prediction logic since generation is already done. However, the semiconductor chip may utilize virtual-to-physical mappings for addresses. Memory accesses within a virtual address space visible to software applications are translated to a physical address space corresponding to the actual physical memory available to the computing system. A condition known as aliasing may occur when two or more virtual addresses map to a same physical address. A first virtual address may be generated during predecoding and stored in the instruction cache. The first virtual address may point to a first physical address. A read cache hit in the instruction cache may occur for a second virtual address different from the first virtual address, wherein the second virtual address also points to the first physical address. Data corruption may now occur followed by erroneous operation by the software application.

In view of the above, efficient methods and mechanisms for efficiently indicating branch target addresses are desired.

SUMMARY OF EMBODIMENTS

Systems and methods for efficiently indicating branch target addresses are contemplated. In various embodiments, a semiconductor chip receives instructions of a computer program from off-die memory. The chip predecodes the received instructions. One or more of the received instructions may be control flow instructions. The control flow instructions include both conditional and unconditional branch instructions. Some control flow instructions include a relative displacement within an immediate field. The displacement is relative to a program counter address (PC) used to fetch the control flow instruction. The PC relative displacement stored in the immediate field may be used to later fetch instructions from a non-sequential location in memory. In response to determining a particular instruction of the received instructions is a control flow instruction with a PC relative displacement, the chip recodes the particular instruction.

The chip replaces a portion or subset of the PC relative displacement in the particular instruction with a subset of a target address. The subset of the target address used to replace the subset of the PC relative displacement may be an untranslated physical subset of the target address. The bit positions of another subset of the PC relative displacement in the immediate field may correspond to bit positions of a virtual subset of the target address that are sent to a translation lookaside buffer (TLB) for address translation. Therefore, only a physical portion of a target address is embedded in the control flow instruction. Following, the recoded control flow instruction is installed in the instruction cache.

When the recoded control flow instruction is fetched and decoded, the remaining portion of the PC relative displacement is added to a virtual portion of the PC used to fetch the control flow instruction. The result is concatenated with the portion of the target address embedded in the control flow instruction to form a full target address.

These and other embodiments will be further appreciated upon reference to the following description and drawings.

Figure 1:
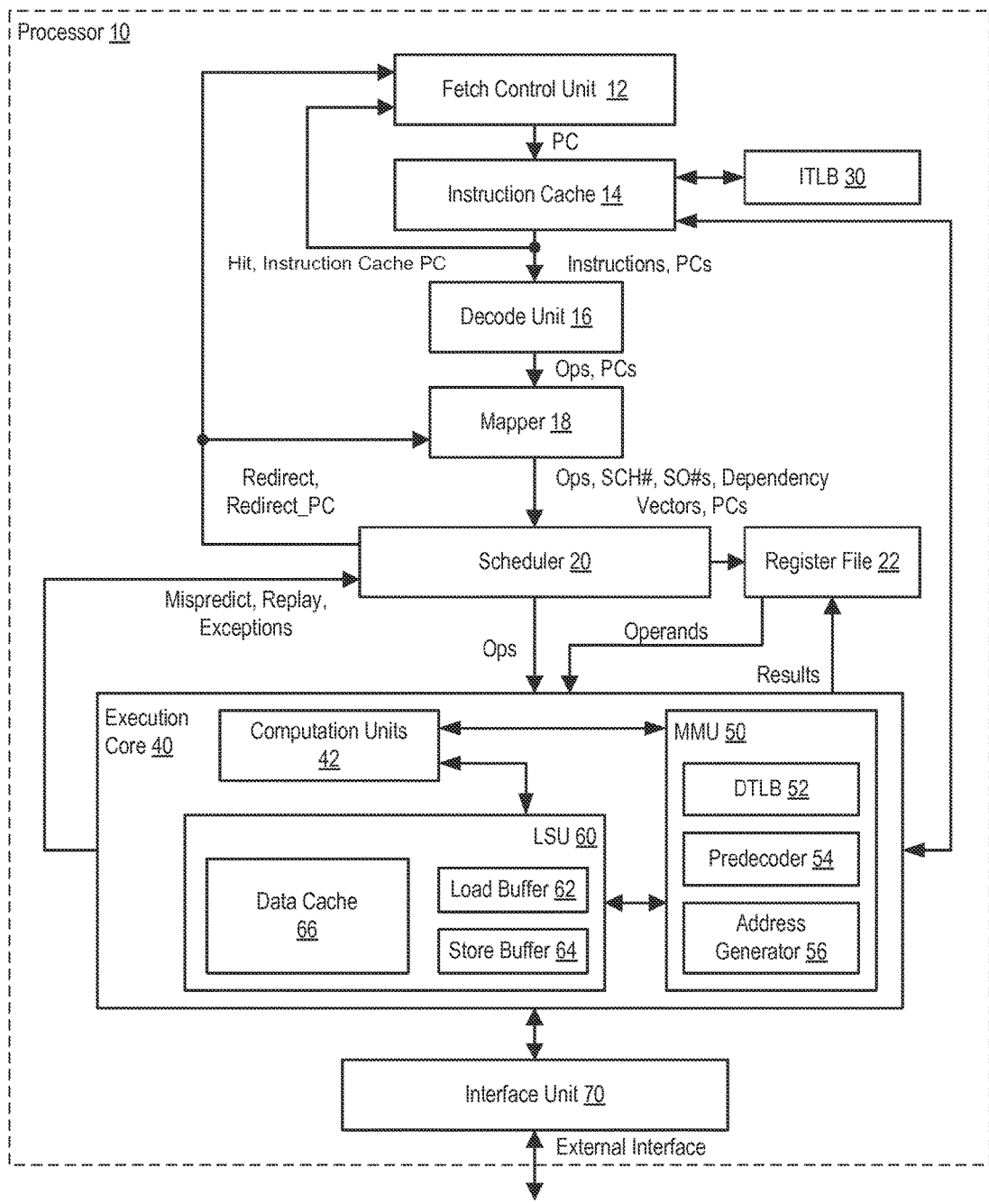
FIG. 1 is a generalized block diagram of one embodiment of a processor.

While the embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) for that unit/circuit/component.

DETAILED DESCRIPTION

In the following description, numerous specific details are set forth to provide a thorough understanding of the embodiments described in this disclosure. However, one having ordinary skill in the art should recognize that the embodiments might be practiced without these specific details. In some instances, well-known circuits, structures, and techniques have not been shown in detail for ease of illustration and to avoid obscuring the description of the embodiments.

Referring to FIG. 1, a generalized block diagram illustrating one embodiment of a processor 10 is shown. In the illustrated embodiment, the processor 10 includes a fetch control unit 12, an instruction cache 14, a decode unit 16, a mapper 18, a scheduler 20, a register file 22, an execution core 40, and an interface unit 70. The fetch control unit 12 is coupled to provide a program counter address (PC) for fetching from the instruction cache 14. The instruction cache 14 is coupled to provide instructions (with PCs) to the decode unit 16, which is coupled to provide decoded instruction operations (ops, again with PCs) to the mapper 18. The instruction cache 14 is further configured to provide a hit indication and an instruction cache PC to the fetch control unit 12.

Fetch control unit 12 may be configured to generate fetch PCs for instruction cache 14. In some embodiments, fetch control unit 12 may include one or more types of branch predictors. The outputs of the branch predictors may be sent to a next fetch predictor. The next fetch predictor may select a next fetch PC from multiple sources. The multiple sources may include a sequential PC, the outputs of the branch predictors, addresses stored in registers identified within control flow instructions, addresses stored in registers corresponding to replay processing, and so forth. When generating a fetch PC, in the absence of a non-sequential branch target and depending on how many bytes are fetched from instruction cache 14 at a given time, fetch control unit 12 may generate a sequential fetch PC by adding a known offset to a current PC value.

The instruction cache 14 may be a cache memory for storing instructions to be executed by the processor 10. The instruction cache 14 may have any capacity and construction (e.g. direct mapped, set associative, fully associative, etc.). The instruction cache 14 may have any cache line size. For example, 64 byte cache lines may be implemented in an embodiment. Other embodiments may use larger or smaller cache line sizes. In response to a given PC from the fetch control unit 12, the instruction cache 14 may output up to a maximum number of instructions. It is contemplated that processor 10 may implement any suitable instruction set architecture (ISA), such as, e.g., the ARM™, PowerPC™, or x86 ISAs, or combinations thereof.

Processor 10 may implement an address translation scheme in which one or more virtual address spaces are made visible to executing software. Memory accesses within the virtual address space are translated to a physical address space corresponding to the actual physical memory available to the system, for example using a set of page tables, segments, or other virtual memory translation schemes. The instruction cache 14 may be partially or completely addressed using physical address bits rather than virtual address bits. For example, instruction cache 14 may use virtual address bits for cache indexing and physical address bits for cache tags.

In order to avoid the cost of performing a full memory translation when performing a cache access, processor 10 may store a set of recent and/or frequently used virtual-to-physical address translations in a translation lookaside buffer (TLB), such as Instruction TLB (ITLB) 30. During operation, ITLB 30 may receive virtual address information and determine whether a valid translation is present. If so, ITLB 30 may provide the corresponding physical address bits to instruction cache 14. If not, ITLB 30 may cause the translation to be determined, for example by raising a virtual memory exception.

The operating system may instruct the processor 10 to execute a particular thread of a process. The operating system may provide an address or a pointer to the start of the instructions of the particular thread stored in off-die memory. The interface unit 70 may be used to retrieve the instructions in off-die memory and send them to the instruction cache 14. Control logic in the processor 10 may perform predecoding of the received instructions. In some embodiments, this control logic is within the predecoder 54 within the memory management unit (MMU) 50. In other embodiments, the predecode logic is located elsewhere in the processor 10. The predecoding may determine at least whether any of the received instructions includes at least a program counter (PC) relative displacement. Control flow instructions may include a PC relative displacement within an immediate field. The PC relative displacement stored in the immediate field may be used to fetch instructions from a non-sequential location in memory.

When the predecode logic within the processor 10 determines an instruction includes a PC relative displacement, the predecode logic may replace a portion or subset of the PC relative displacement with a subset of a target address. The instruction may be a control flow instruction such as a conditional branch instruction or an unconditional branch instruction. The subset of the target address used to replace the subset of the PC relative displacement may be an untranslated physical subset of the target address.

In some examples, the least significant 14 bits of the target address may include the untranslated physical portion of the target address. In addition, the immediate field may have a size of 20 bits. Therefore, the least significant 14 bits of the immediate field may be replaced with the least significant and physical 14 bits of the target address. To produce this portion of the target address, the predecode logic may sum the least significant 14 bits of the PC relative displacement stored in the least significant 14 bits of the 20-bit immediate field with the least significant 14 bits of the PC used to fetch the control flow instruction. In this example, the least significant 14 bits of the PC is not used to access a TLB for address translation. Although the least significant 14 bits of the immediate field is replaced with the subset of the target address produced by the sum operation, the most significant 6 bits of the 20-bit immediate field remain intact.

The control flow instruction may be stored in the instruction cache 14 with the least significant 14 bits of the immediate field now storing the subset of the target address rather than the least significant subset of the PC relative displacement. The most significant 6 bits of the 20-bit immediate field continues to store the most significant 6 bits of the PC relative displacement. Other sizes for the immediate field and the subsets are possible and contemplated. However, the subset of the PC relative displacement being replaced within the control flow instruction corresponds to an untranslated physical subset of the target address.

The decode unit 16 may include an adder to determine the full target address in a later clock cycle after the control flow instruction is fetched. Alternatively, the computation units 42 in the execution core 40 may determine the full target address in a later clock cycle. Referring again to the example with a 20-bit immediate field, the adder may sum the most significant 6 bits of the PC relative displacement stored in the most significant 6 bits of the 20-bit immediate field with the upper portion of the PC used to fetch the control flow instruction. The upper portion of the PC may include the bits more significant than the least significant 14 bits of the PC. The upper portion of the PC may be a translated virtual portion of the PC. The upper portion of the PC may be an output of the TLB used for address translation. The result of the sum may be concatenated with the subset of the target address stored in the control flow instruction. Again, this stored subset of the target address is located in the least significant 14 bits of the immediate field within the control flow instruction. The result of the concatenation is the full target address.

By embedding only the physical portion of the target address in the control flow instruction during the instruction cache fill or install, data corruption from virtual-to-physical aliasing is prevented. No virtual portion of the target address is embedded in the control flow instruction during the instruction cache fill. Rather, the virtual portion of the target address is produced during processing of the control flow instruction following fetching from the instruction cache. Branch prediction logic may be accessed early with the physical portion of the target address after decode and prior to producing the full target address. Since the full target address is not produced during the instruction cache fill, but rather after instruction fetch, aliasing does not occur and corrupt the data. During a pipeline stage after instruction fetch, the full target address is produced with the virtual portion of the PC used to fetch the control flow instruction.

At times the operating system maps the physical addresses of a section of a computer program to two different processes. Therefore, each of the physical addresses for the section of the computer program has mappings to two different virtual addresses. If a virtual portion of the target address is embedded in the control flow instruction during the instruction cache fill, virtual-to-physical aliasing may occur and cause data corruption. For example, the operating system may create two mappings for a physical address "PA1", such as a first virtual address "VA1" for a first process and a second virtual address "VA2" for a second process. During the instruction cache fill for the first process, a control flow instruction, such as a jump instruction, may have a displacement "D" stored in an immediate field. The control flow instruction may be accessed with the physical address PA1. If the full target address is generated during the instruction cache fill, then the displacement D in the immediate field may be replaced with the full target address, which is VA1+D.

During the instruction cache fill for the second process, the same control flow instruction accessed with the physical address PA1 is not refilled into the instruction cache. Therefore, the control flow instruction stored in the instruction cache is embedded with the target address (VA1+D) used by the first process. During instruction fetch of the control flow instruction for the second process, the virtual address VA2 is translated to the physical address PA1. A hit occurs in the instruction cache and the control flow instruction is read out.

During a pipeline stage after instruction fetch for the second process, the full target address (VA1+D) is read out of the immediate field. However, for the second process, the correct full target address is (VA2+D). Therefore, the control flow instruction causes the wrong fetch address to be used to access the instruction cache and incorrect operation has occurred. To prevent data corruption from the aliasing problem, only the physical portion of the full target address is embedded in the immediate field of the control flow instruction as described earlier.

Continuing with the components in the processor 10, the decode unit 16 may generally be configured to decode received instructions into instruction operations (ops). Generally, an instruction operation may be an operation that the hardware included in the execution core 40 is capable of executing. Each instruction may translate to one or more instruction operations which, when executed, result in the operation(s) defined for that instruction being performed according to the instruction set architecture implemented by the processor 10.

In some embodiments, each instruction may decode into a single instruction operation. The decode unit 16 may be configured to identify the type of instruction, source and destination operands, etc., and the decoded instruction operation may include the instruction along with some of the decode information. In other embodiments in which each instruction translates to a single op, each op may simply be the corresponding instruction or a portion thereof (e.g. the opcode field or fields of the instruction).

Ops generated by the decode unit 16 may be provided to the mapper 18. The mapper 18 is coupled to provide ops, a scheduler number (SCH#), source operand numbers (SO#s), one or more dependency vectors, and PCs to the scheduler 20. The mapper 18 may implement register renaming to map source register addresses from the ops to the source operand numbers (SO#s) identifying the renamed source registers.

The scheduler 20 is coupled to receive replay, mispredict, and exception indications from the execution core 40, is coupled to provide a redirect indication and redirect PC to the fetch control unit 12 and the mapper 18, is coupled to the register file 22, and is coupled to provide ops for execution to the execution core 40. The scheduler 20 may be configured to store the ops in the scheduler entries identified by the respective SCH#s, along with the SO#s and PCs. The scheduler 20 may be configured to schedule the ops for execution in the execution core 40.

When an op is scheduled, the scheduler 20 may be configured to read its source operands from the register file 22 and the source operands may be provided to the execution core 40. The execution core 40 may be configured to return the results of ops that update registers to the register file 22. In some cases, the execution core 40 may forward a result that is to be written to the register file 22 in place of the value read from the register file 22 (e.g. in the case of back to back scheduling of dependent ops).

The execution core 40 includes computation units 42 for executing received ops according to associated opcodes. Examples of operations to execute include integer and floating-point arithmetic operations. The execution core 40 may also include a load store unit (LSU) 60 for handling memory access operations. The memory access operations may include various types of integer and floating-point load and store operations.

The LSU 60 may include a load buffer 62, a store buffer 64 and a data cache 66. The load buffer 62 may store address information for load operations that have not yet committed when the load buffer 62 receives the data from a data cache, the store buffer 64, or a lower-level memory. The store buffer 64 may store address and data information for store operations that have committed, in order to facilitate load dependency checking.

The execution core 40 may include a data cache 66, which may be a cache memory for storing data to be processed by the processor 10. One or more levels of a data cache may be used. For example, the LSU 60 may include a level-one (L1) data cache (not shown) and the L2 data cache 66. A L3 data cache or other lower-level memory may be located off-die. Other combinations for a memory hierarchy are possible and contemplated. Like the instruction cache 14, the data cache 66 may have any suitable capacity, construction, or line size (e.g. direct mapped, set associative, fully associative, etc.). Moreover, the data cache 66 may differ from the instruction cache 14 in any of these details. The data cache 66 may store recently accessed data.

As with the instruction cache 14, in some embodiments, the data cache 66 may be partially or entirely addressed using physical address bits. Correspondingly, a data TLB (DTLB) 52 within the memory management unit (MMU) 50 may be provided to store virtual-to-physical address translations for use in accessing the data cache 66. A virtual address space for the data stored in system memory and used by a software process may be divided into pages of a prefixed size. In other examples, segments may be used.

The MMU 50 may also include a predecoder 54 for predecoding instructions retrieved from off-die memory. In various embodiments, the control logic described earlier for detecting control flow instructions with a PC relative displacement may be located within the predecoder 54. The logic may also replace a subset or a portion of the PC relative displacement with a subset of a target address. The subset of the target address may be an untranslated physical subset of the full target address. The address generator 56 may generate the subset of the target address using the PC and the stored displacement. In other embodiments, the control logic for the predecoder 54 and the address generator 56 may be located within a cache controller for the instruction cache 14. In yet other embodiments, the control logic may be located elsewhere in the processor 10.

The execution core 40 is coupled to the interface unit 70, which is further coupled to one or more external interfaces of the processor 10. The interface unit 70 may generally include the circuitry for interfacing the processor 10 to other devices on the external interface. The external interface may include any type of interconnect (e.g. bus, packet, etc.). The external interface may be an on-chip interconnect, if the processor 10 is integrated with one or more other components (e.g. a system on a chip configuration). The external interface may be on off-chip interconnect to external circuitry, if the processor 10 is not integrated with other components. The MMU 50 and the interface 70 may be used to retrieve instructions of a computer program from off-die memory. The received instructions may be predecoded by the predecoder 54 as described earlier. After predecoding and any replacement of a portion of the immediate field in a control flow instruction, the instructions are stored in the instruction cache 14.

Figure 2:
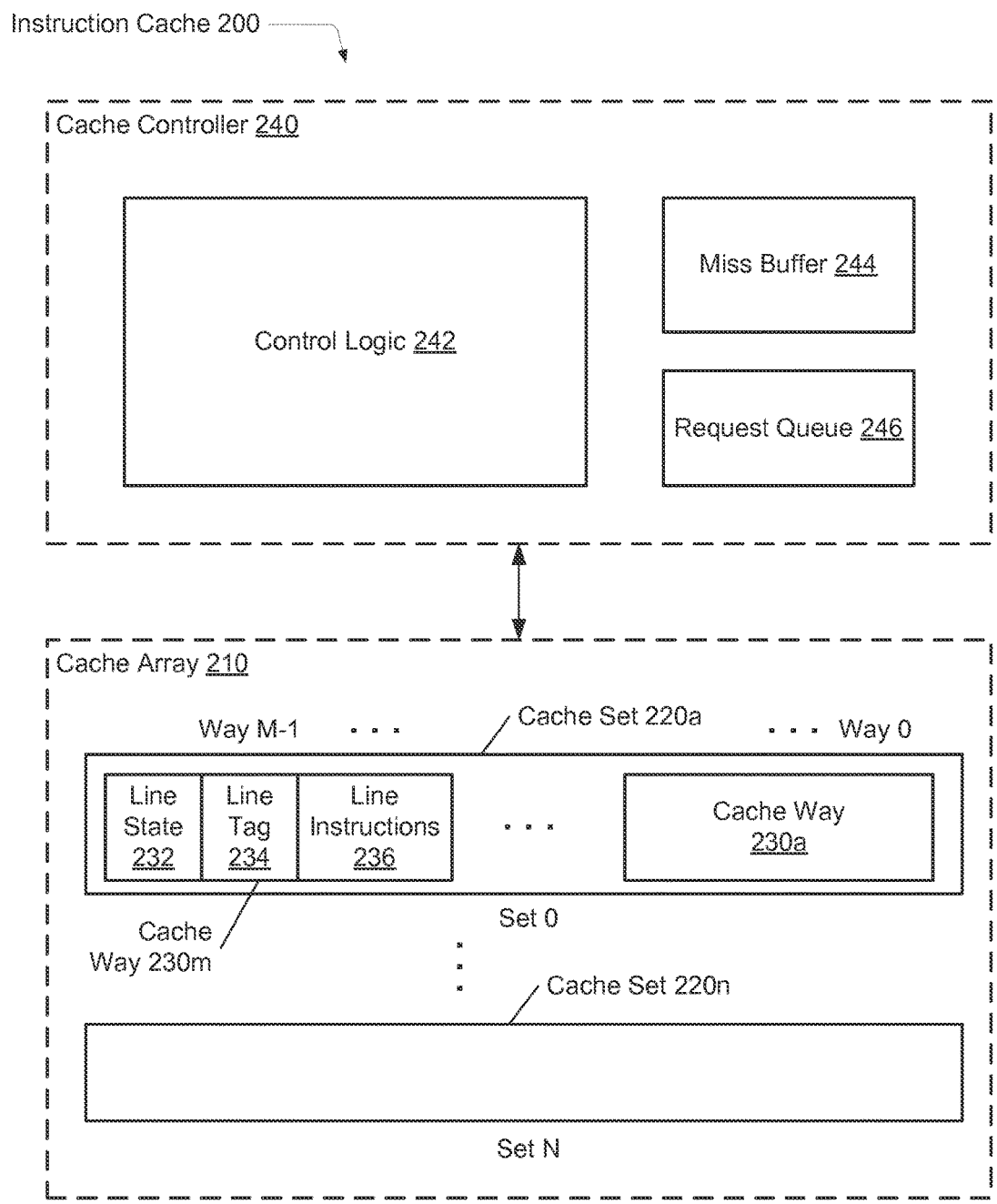
FIG. 2 is a generalized block diagram of one embodiment of an exemplary cache.

Turning now to FIG. 2, a generalized block diagram of one embodiment of an exemplary instruction cache 200 is shown. As shown in the illustrated embodiment, the instruction cache 200 includes a cache array 210 and a cache controller 240. Generally, the cache array 210 may store one or more cache lines, each of which is a copy of one or more instructions stored at a corresponding address in the system memory. As used herein, a "line" is a set of bytes stored in contiguous memory locations, which are treated as a unit for coherency purposes. As used herein, the terms "cache block", "block", "cache line", and "line" are interchangeable. In some embodiments, a line may also be the unit of allocation and deallocation in a cache. The number of bytes in a line may be varied according to design choice, and may be of any size. As an example, 32 byte and 64 byte lines are often used.

The cache array 210 may store data in various manners. For example, data may be stored in the cache array 210 using a set-associative cache organization. An M-way set associativity is shown in the illustrated embodiment, wherein M is an integer. Each one of the cache sets 220a-220n includes cache ways 230a-230m. A different number of ways, such as 4-way, 8-way, 16-way, or other, within the set-associative cache array 210 may be chosen. In various embodiments, each one of the cache sets 220a-220n utilizes the chosen storage manner, such as set associativity.

Each one of the cache ways 230a-230m may include a line state 232, a line tag 234, and a line instruction 236. Each of the line state 232, line tag 234, and the line instruction 236 is data stored in the instruction cache 200. Although line state 232 and line tag 234 may be stored in contiguous bits with the line instruction 236 within each one of the cache ways 230a-230m, in other embodiments, the line state 232 and the line tag 234 may be stored in a separate array, rather than in a same array as the line instruction 236.

The line state 232 may comprise at least one or more of the following: a valid bit, a cache line owner encoding that indicates the source which owns the corresponding cache line, Least Recently Used (LRU) eviction information used in association with a cache replacement algorithm employed by the cache controller 240, an indication that designates a cache coherency state, a privilege or security state, and so forth. Other included state information is possible and contemplated.

A given one of the cache sets 220a-220n may be selected from other sets by a line index portion of an address used to access the cache 200. A cache line hit may occur when a combination of a portion of the line state 232 and the line tag 234 match values from an access request. In addition, an offset in the address of the access request may be used to indicate a specific byte or word within a cache line.

The cache controller 240 may include at least control logic 242, a miss buffer 244 and a request queue 246. Memory access requests may be stored in the request queue 246. A cache miss may cause request information to be stored in the miss buffer 244. The information stored in the miss buffer 244 may be used later to send requests to a lower level of the cache hierarchy. Generally, the control logic 242 may determine a manner used to order accesses of the cache array 210 and perform updates to state, address and instruction data stored in the cache array 210.

One or more of the line instructions 236 may store data for a control flow instruction with a PC relative displacement. Prior to storing the control flow instruction in one of the line instructions 236 in the instruction cache 200, a portion of the immediate field in the instruction may have been replaced with a portion of a full target address. The replacement may occur as described earlier. In some embodiments, the conditional replacement of the portion of the immediate field occurs in control logic within a memory management unit. In other embodiments, the conditional replacement occurs in the control logic 242 within the cache controller 240 of the instruction cache 200. In yet other embodiments, the conditional replacement occurs in control logic placed elsewhere in the corresponding semiconductor chip.

Information stored in a corresponding one of the line states 232 may indicate the information in the line instruction 236 is clean, rather than dirty, even when the portion of the immediate field is replaced. Therefore, when the corresponding line instruction 236 is evicted, memory still stores the original control flow instruction with the full displacement in the immediate field.

Figure 3:
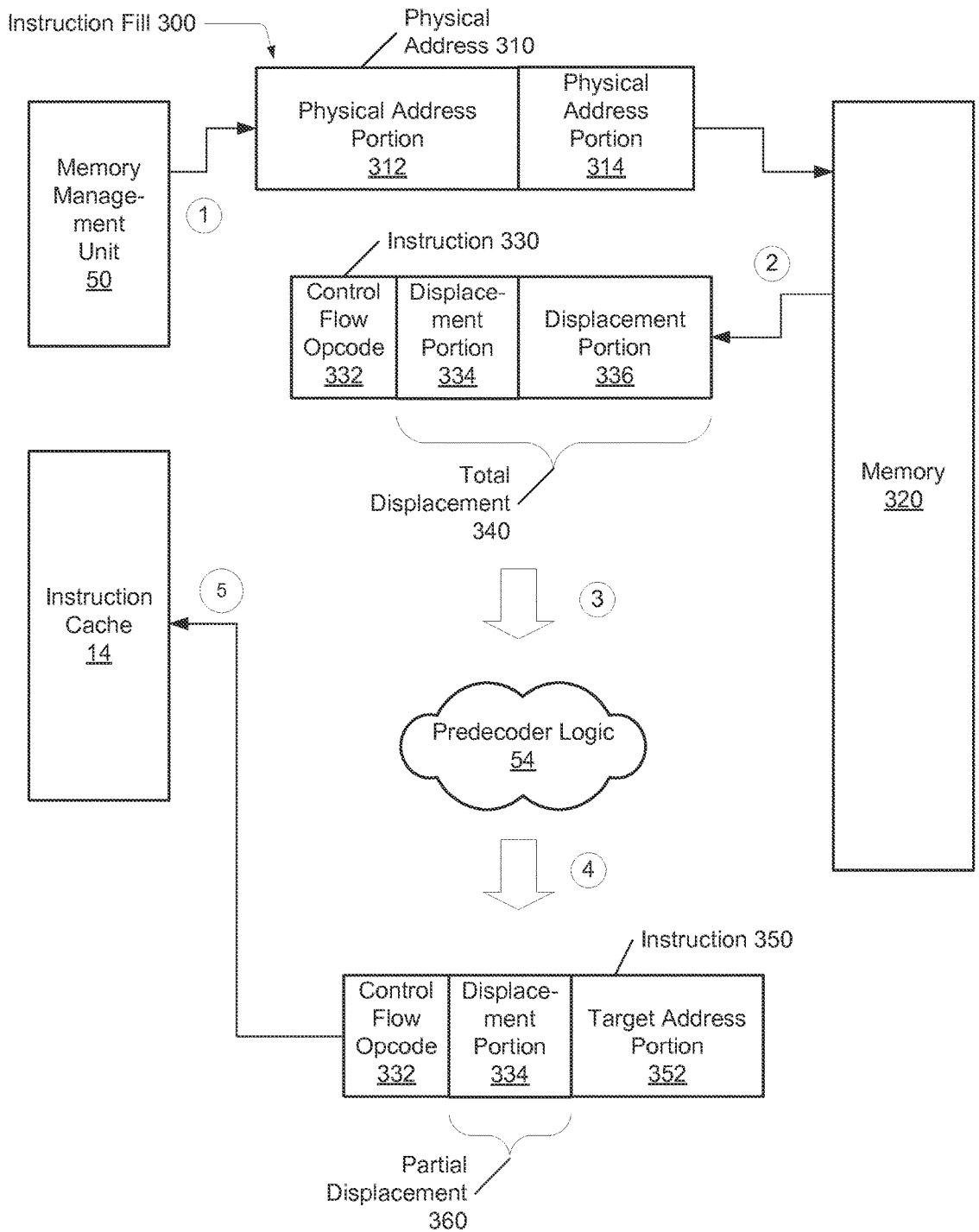
FIG. 3 is a generalized block diagram of one embodiment of an instruction fill.

Referring now to FIG. 3, a generalized block diagram of one embodiment of an instruction fill 300 is shown. Circuit and logic components described earlier are numbered identically as previously done. For example, the memory management unit (MMU) is numbered 50. The operating system (OS) may divide a computer program into multiple processes, each including multiple threads. A sequence of steps 1 to 5 is shown.

The OS may instruct a semiconductor chip, such as a microprocessor, system on a chip (SOC) or other, to execute a particular thread of a process. The OS may provide an address or a pointer to the start of the instructions of the particular thread stored in off-die memory. The MMU 50 may be used to generate the addresses and retrieve the instructions in off-die memory. The MMU 50 may utilize an interface unit to send the requests to off-die memory for the instructions. The interface unit is not shown for ease of illustration. Alternatively, the interface unit or another unit may be used to generate the addresses for the requested instructions.

In sequence 1, the generated physical address 310 is sent in a request to off-die memory 320. The generated physical address 310 may include two portions 312 and 314. In various embodiments, the physical address portion 312 may include a value stored in a TLB. For example, the portion 312 may include a physical page number. The OS may determine the mapping between the portion 312 and a corresponding virtual value, such as a virtual page number, stored in the TLB. The portion 314 may store values that do not have corresponding mappings in the TLB.

In response to the request, the instruction 330 may be retrieved from the off-die memory 320. In sequence 2, the retrieved instruction 330 is sent to the semiconductor chip. As shown, the instruction 330 is a control flow operation with a PC relative displacement. The instruction 330 may be a conditional or an unconditional branch instruction. The instruction 330 includes at least a control flow opcode 332 and a total PC relative displacement 340.

The total displacement 340 may include a first displacement portion 334 and a second displacement portion 336. The second displacement portion 336 may be placed in bit positions corresponding to an untranslated physical portion of a fetch address. For example, the least significant 14 bits of a fetch address may store untranslated physical values, whereas bits more significant than these 14 bits may store virtual values that are translated during fetching. Other sizes and locations for the physical values and the second displacement portion 336 are possible and contemplated.

When the semiconductor chip receives the instruction 330, the chip may buffer the instruction 330 with other received instructions. In sequence 3, the instruction 330 is sent to the predecoder logic 54, which inspects the opcode 332. In sequence 4, the predecoder logic 54 generates the instruction 350 from the instruction 330. In response to determining the opcode 332 indicates a control flow instruction with a PC relative displacement, the predecoder logic 54 replaces the displacement portion 336 with the target address portion 352 while maintaining to store the displacement portion 334 in the instruction 350. The displacement portion 334 is not replaced in the instruction 350.

The target address portion 352 may be the untranslated physical portion of the full target address. To produce the target address portion 352, the predecoder logic may sum the displacement portion 336 with the physical address portion 314. In sequence 5, the instruction 350 is installed in the instruction cache 14.

Figure 4:
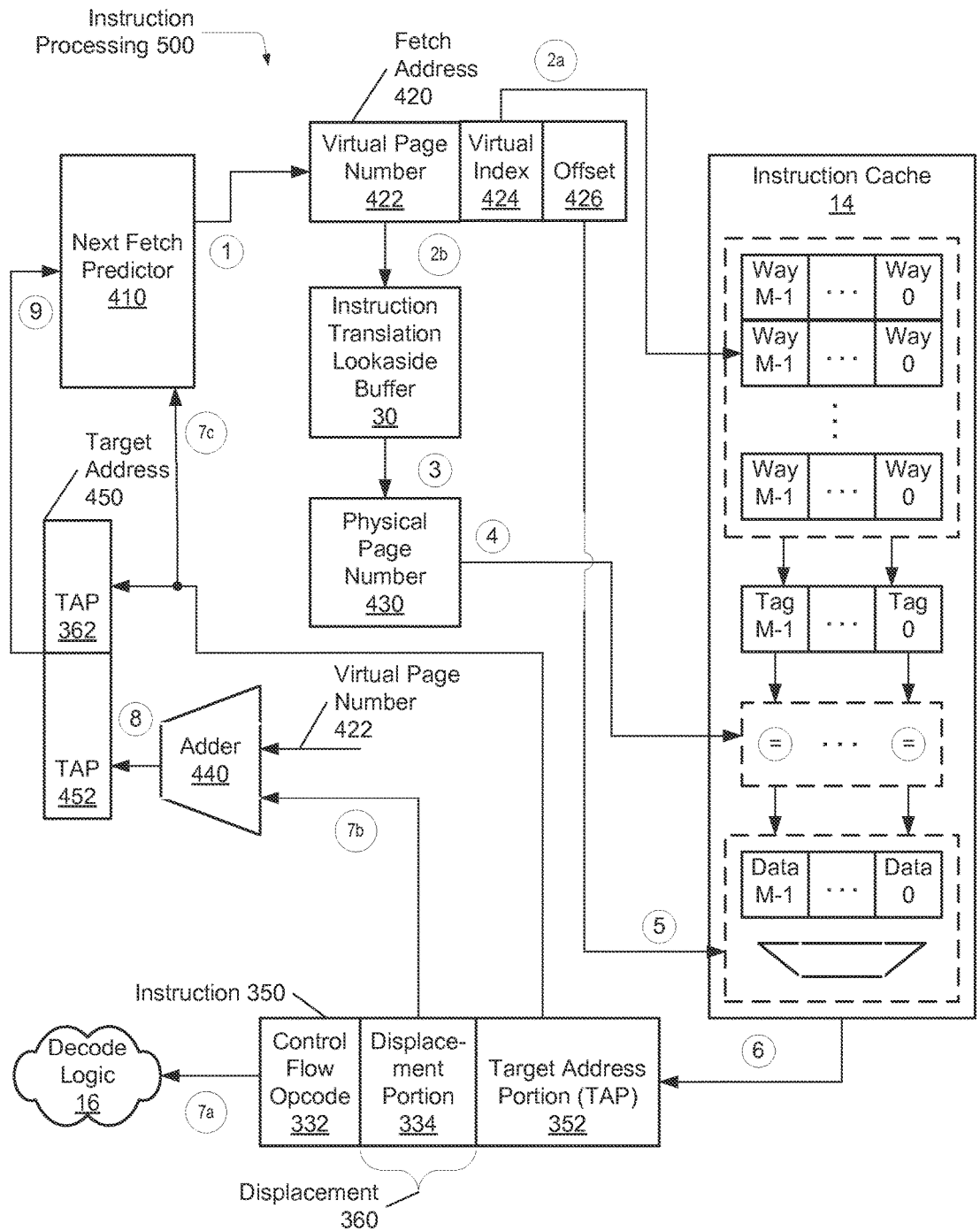
FIG. 4 is a generalized block diagram of one embodiment of instruction processing.

Turning now to FIG. 4, a generalized block diagram of one embodiment of instruction processing on a semiconductor chip 400 is shown. Circuit and logic components described earlier are numbered identically as previously done. A sequence of steps 1 to 9 is shown. In sequence 1, the next fetch predictor 410 sends the next fetch address 420 to the instruction cache 14. As described earlier, the next fetch predictor 410 may select a next fetch PC from multiple sources. The multiple sources may include a sequential PC, the outputs of one or more branch predictors, addresses stored in registers identified within control flow instructions for indirect displacements, addresses stored in registers corresponding to replay processing, and so forth.

The fetch address 420 may include a portion that accesses the translation lookaside buffer (TLB) 30 and a portion that does not access the TLB. As shown, the portion that accesses the TLB is the virtual page number 422. The portions that do not access the TLB include the virtual index 424 and the page offset 426. Sequences 2a and 2b may occur simultaneously. In sequence 2a, the virtual index 424 is used to access the instruction cache 14. The virtual index 424 may select a particular set of multiple sets in the instruction cache 14. In sequence 2b, the virtual page number 422 is used to access the TLB 30. In sequence 3, the TLB 30 may produce the physical page number 430. The TLB 30 may store the mapping between the virtual page number 422 and the physical page number 430.

In sequence 4, the physical page number 430 is compared with the physical tags in the set selected by the virtual index 424. In sequence 5, a portion or all of the offset 426 may be used to select one or more instructions from the selected data. In sequence 6, a given fetched instruction 360 is sent to a decode pipeline stage. Sequences 7a to 7c may occur simultaneously. In sequence 7a, the opcode 332 is sent to decode logic 16. The decode logic 16 may determine the instruction 350 is a control flow instruction with a PC relative displacement. In sequence 7b, the displacement portion 334 is sent to the adder 440.

In sequence 7c, the target address portion 352 is used to access one or more branch predictors within the next fetch predictor 410. In sequence 8, the adder 440 sums the virtual page number 422 within the fetch address 420 and the displacement portion 334 to produce the target address portion 452. The target address portion 352 from the fetched instruction 350 is concatenated with the target address portion 452 to produce the total target address 450. The next fetch predictor 410 receives the total target address 450. One or more of the above operations may be gated by the decode logic 16 based on whether the opcode 332 indicates a control flow instruction with a PC relative displacement.

Figure 5:
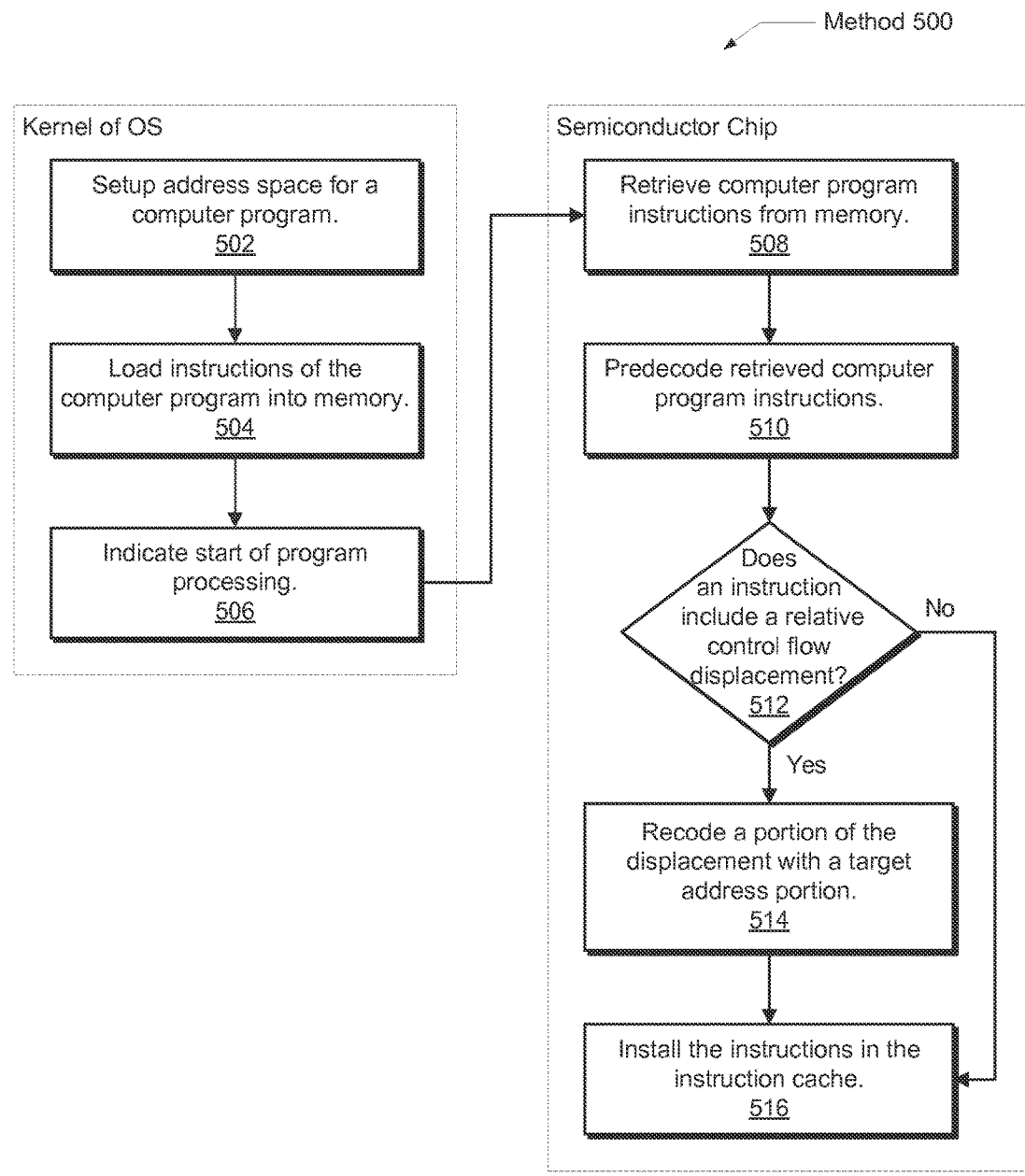
FIG. 5 is a generalized flow diagram illustrating one embodiment of a method for recoding control flow instructions with a PC relative displacement.

Turning now to FIG. 5, a generalized flow diagram of one embodiment of a method 500 for recoding control flow instructions with a PC relative displacement is shown. Method 500 may be modified by those skilled in the art in order to derive alternative embodiments. Also, the steps in this embodiment are shown in sequential order. However, some steps may occur in a different order than shown, some steps may be performed concurrently, some steps may be combined with other steps, and some steps may be absent in another embodiment.

Generally speaking, software programmers write applications to perform work according to an algorithm or a method. A disk memory may store an operating system (OS) for a computer system. For a given software application, in block 502, the kernel of the OS sets up an address space for the application. The address space may be a contiguous virtual address space, wherein a mapping between virtual addresses and physical addresses determines the location of values in physical memory, such as disk memory and DRAM. The given ISA for a corresponding semiconductor chip may be used to select a manner for declaring and allocating regions of memory.

The software application may be stored in one or more of a disk memory, a dynamic random access memory (DRAM), dual in-line memory modules (dimms), and a peripheral device. If the software application is not already located in the disk memory, then in block 504, the kernel of the OS loads the application's code into the disk memory. The instructions of the software application may also be loaded into DRAM or dimms. The kernel may also set up a stack for the application.

When the OS determines the software application or computer program can begin processing, in block 506, an indication to start processing the instructions is asserted. In response, the kernel instructs a corresponding semiconductor chip to branch to a given location inside the application code and begin instruction processing. In some embodiments, not all of the instructions and the data need to be stored in physical memory before execution begins. In various embodiments, the semiconductor chip is a microprocessor. In other embodiments, the semiconductor chip is a SOC, a GPU, or other processing unit.

In block 508, the semiconductor chip retrieves the instructions of the software application. The chip may send requests for instructions based on the given location provided by the kernel. The instructions may be retrieved from DRAM, dimms, or disk memory. In block 510, the retrieved instructions are predecoded by the chip. In some embodiments, control logic within a memory controller or a memory management unit predecodes the received instructions. In other embodiments, the control logic for predecoding the received instructions is located in a cache controller or elsewhere in the chip.

The predecoding of the received instructions may determine whether one or more of the received instructions are control flow operations with a PC relative displacement. If such an instruction is detected by the predecode logic in the semiconductor chip (conditional block 512), then in block 514, this instruction is recoded. For example, a portion of the displacement in the instruction is recoded with a target address portion. The recoding may occur as described earlier. The target address portion may be the untranslated physical portion of the full target address. To produce the target address portion, the predecoder logic may sum the displacement portion being replaced with the portion of the physical address that is not translated by a TLB. The physical address is the address used to retrieve the instruction from the memory. In block 516, the received instructions are stored or installed in the instruction cache.

Figure 6:
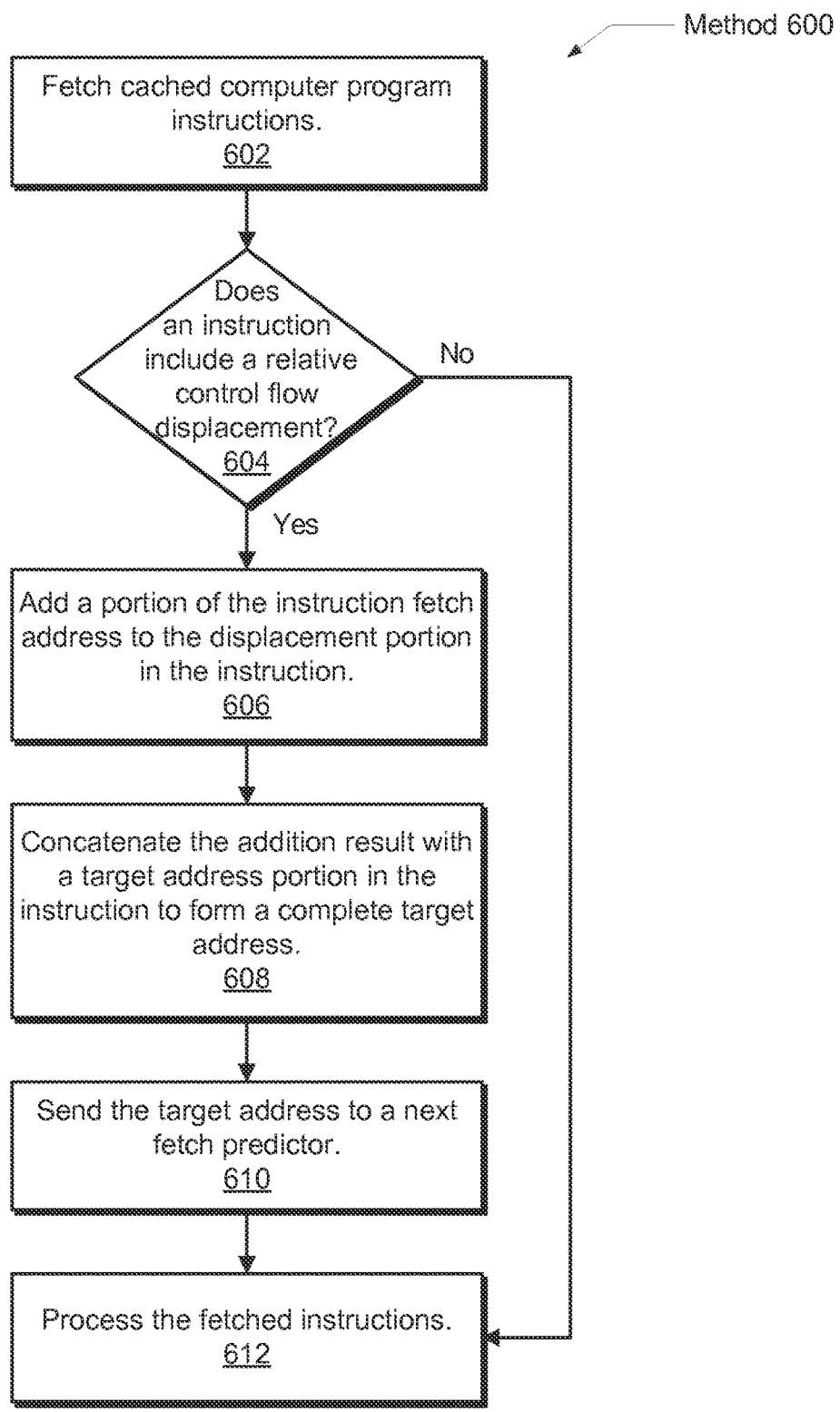
FIG. 6 is a generalized flow diagram illustrating one embodiment of a method for decoding and processing control flow instructions with PC relative displacements.

Turning now to FIG. 6, a generalized flow diagram of one embodiment of a method 600 for decoding and processing control flow instructions with PC relative displacements is shown. Method 600 may be modified by those skilled in the art in order to derive alternative embodiments. Also, the steps in this embodiment are shown in sequential order. However, some steps may occur in a different order than shown, some steps may be performed concurrently, some steps may be combined with other steps, and some steps may be absent in another embodiment.

In the embodiment shown, instructions of a computer program are fetched in block 602. The opcode of a fetched instruction is inspected to determine whether it indicates a control flow instruction with a PC relative displacement. If such a fetched instruction is detected by the decode logic in the semiconductor chip (conditional block 604), then in block 606, a portion of the instruction fetch address is added to the displacement portion in the instruction. The portions may correspond to bit positions in the fetch address that are sent for address translation to a TLB. Referring again to FIG. 4, the adder 440 sums the virtual page number 422 within the fetch address 420 and the displacement portion 334 to produce the target address portion 452.

In block 608, the addition result is concatenated with a target address portion in the instruction to form a complete target address. In block 610, the next fetch predictor receives the target address. In block 612, the fetched instructions are processed.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processor comprising:
   an interface to a memory located external to a cache subsystem, wherein the interface is configured to send requests comprising physical fetch addresses to the memory for instructions;
   a predecode unit; and
   an instruction cache configured to store instructions; and
   wherein the predecode unit is configured to:
      receive instructions retrieved from the memory before the instructions are stored in the instruction cache; and
      in response to determining a first instruction of the instructions received from the memory is a branch instruction with an immediate field storing a value that represents a displacement from a program counter (PC) used to fetch the branch instruction to a target of the branch instruction, recode the first instruction by:
         replacing a lower portion of the displacement with a lower portion of a virtual address of the target of the branch instruction, wherein the lower portion of the displacement corresponds to a physical portion of the virtual address; and
         retaining an upper portion of the displacement, wherein the upper portion of the displacement corresponds to a virtual portion of the virtual address; and store the first instruction as recoded in the instruction cache prior to the first instruction as recoded being fetched during an instruction fetch pipeline stage for processing in later pipeline stages; and a fetch unit configured to fetch instructions from the instruction cache for execution.

2. The processor as recited in claim 1, wherein in response to determining the first instruction is not a branch instruction, the predecode unit is configured to store the first instruction in the instruction cache without performing said recode of the first instruction.

3. The processor as recited in claim 2, wherein the predecode unit is further configured to generate a virtual address of the first instruction to send to the instruction cache, wherein the virtual address of the first instruction has at least two different virtual-to-physical mappings corresponding to at least two different processes.

4. The processor as recited in claim 3, wherein an upper portion of each of the virtual address of the first instruction and the virtual address of the target of the branch instruction is based on which one of the at least two different processes is active.

5. The processor as recited in claim 1, wherein prior to storing the first instruction in the instruction cache, the predecode unit is further configured to determine the lower portion of the virtual address of the target of the branch instruction by summing the lower portion of the displacement in the first instruction with the lower portion of a physical fetch address of the first instruction sent to the external memory.

6. The processor as recited in claim 5, further comprising logic configured to determine the virtual address of the target of the branch by concatenating the upper portion of the virtual address of the target of the branch with the lower portion of the virtual address of the target of the branch stored in the first instruction.

7. The processor as recited in claim 5, wherein the processor further comprises a next fetch predictor logic configured to access the next fetch predictor with the lower portion of the virtual address of the target of the branch stored in the first instruction while determining the upper portion of the virtual address of the target of the branch.

8. A method comprising:

sending requests comprising physical fetch addresses for instructions to a memory located external to a cache subsystem;

receiving at a predecode unit instructions retrieved from the memory before the instructions are stored in an instruction cache; and in response to determining a first instruction of the instructions received from the memory is a branch instruction with an immediate field storing a value that represents a displacement from a program counter (PC) used to fetch the branch instruction to a target of the branch instruction, recoding the first instruction by the predecode unit by:

replacing a lower portion of the displacement with a lower portion of a virtual address of the target of the branch instruction, wherein the lower portion of the displacement corresponds to a physical portion of the virtual address; and retaining an upper portion of the displacement, wherein the upper portion of the displacement corresponds to a virtual portion of the virtual address; and storing the first instruction as recoded in the instruction cache prior to the first instruction as recoded being fetched during an instruction fetch pipeline stage for processing in later pipeline stages; and fetching instructions by a fetch unit from the instruction cache for execution.

9. The method as recited in claim 8, wherein in response to determining the first instruction is not a branch instruction, the method comprises storing the first instruction in the instruction cache without performing said recoding of the first instruction.

10. The method as recited in claim 9, wherein the method further comprises generating a virtual fetch address of the first instruction to send to the instruction cache, wherein the virtual fetch address of the first instruction has at least two different virtual-to-physical mappings corresponding to at least two different processes.

11. The method as recited in claim 10, wherein an upper portion of each of the virtual fetch address of the first instruction and the virtual address of the target of the branch instruction is based on which one of the at least two different processes is active.

12. The method as recited in claim 8, wherein prior to storing the first instruction in the instruction cache, the method further comprises determining the lower portion of the virtual address of the target of the branch instruction by summing the lower portion of the displacement in the first instruction with the lower portion of a physical fetch address of the first instruction sent to the external memory.

13. The method as recited in claim 12, wherein the method further comprises determining the virtual address of the target of the branch by concatenating the upper portion of the virtual address of the target of the branch with the lower portion of the virtual address of the target of the branch stored in the first instruction.

14. The method as recited in claim 12, wherein the method further comprises accessing a next fetch predictor with the lower portion of the virtual address of the target of the branch stored in the first instruction while determining the upper portion of the virtual address of the target of the branch.

15. A non-transitory computer readable storage medium storing program instructions, wherein the program instructions are executable to:

send requests comprising physical fetch addresses for instructions to a memory located external to a cache subsystem;

receive instructions retrieved from the memory before the instructions are stored in an instruction cache; and in response to determining a first instruction of the instructions received from the memory is a branch instruction with an immediate field storing a value that represents a displacement from a program counter (PC) used to fetch the branch instruction to a target of the branch instruction, recode the first instruction by:

replacing a lower portion of the displacement with a lower portion of a virtual address of the target of the branch instruction, wherein the lower portion of the displacement corresponds to a physical portion of the virtual address; and retaining an upper portion of the displacement, wherein the upper portion of the displacement corresponds to a virtual portion of the virtual address; and store the first instruction as recoded in the instruction cache prior to the first instruction as recoded being fetched during an instruction fetch pipeline stage for processing in later pipeline stages; and fetch instructions by a fetch unit from the instruction cache for execution.

16. The non-transitory computer readable storage medium as recited in claim 15, wherein in response to determining the first instruction is not a branch instruction, the program instructions are executable to store the first instruction in the instruction cache without performing said recode of the first instruction.

17. The non-transitory computer readable storage medium as recited in claim 16, wherein the program instructions are further executable to generate a virtual fetch address of the first instruction to send to the instruction cache, wherein the virtual fetch address of the first instruction has at least two different virtual-to-physical mappings corresponding to at least two different processes.

18. The non-transitory computer readable storage medium as recited in claim 17, wherein an upper portion of each of the virtual fetch address of the first instruction and the virtual address of the target of the branch instruction is based on which one of the at least two different processes is active.

\* \* \* \* \*